(12) United States Patent
Lee et al.

(10) Patent No.: US 12,394,779 B2
(45) Date of Patent: Aug. 19, 2025

(54) METHOD OF MANUFACTURING ALL-SOLID-STATE BATTERY AND ALL-SOLID-STATE BATTERY MANUFACTURED USING THE SAME

(71) Applicant: LG Energy Solution, Ltd., Seoul (KR)

(72) Inventors: Jung Pil Lee, Daejeon (KR); Ji Young Kim, Daejeon (KR); Eun Bee Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 796 days.

(21) Appl. No.: 17/424,777

(22) PCT Filed: Apr. 20, 2020

(86) PCT No.: PCT/KR2020/005223
§ 371 (c)(1),
(2) Date: Jul. 21, 2021

(87) PCT Pub. No.: WO2020/226299
PCT Pub. Date: Nov. 12, 2020

(65) Prior Publication Data
US 2022/0069277 A1    Mar. 3, 2022

(30) Foreign Application Priority Data

May 8, 2019 (KR) .................. 10-2019-0053691

(51) Int. Cl.
*H01M 4/04* (2006.01)
*H01M 10/0565* (2010.01)
(Continued)

(52) U.S. Cl.
CPC ..... *H01M 4/0447* (2013.01); *H01M 10/0565* (2013.01); *H01M 10/0585* (2013.01);
(Continued)

(58) Field of Classification Search
CPC ......... H01M 10/0562; H01M 10/0565; H01M 2300/0065; H01M 2300/0068;
(Continued)

(56) References Cited

U.S. PATENT DOCUMENTS

2007/0035070 A1* 2/2007 Jiang .................. B29C 63/16
                                                      425/389
2010/0200172 A1* 8/2010 Espe .................... B30B 15/061
                                                      156/583.1

(Continued)

FOREIGN PATENT DOCUMENTS

CN      207282663 U    4/2018
CN      208433485 U    1/2019
(Continued)

OTHER PUBLICATIONS

Extended European Search Report for Application No. 20802870.4 dated Feb. 10, 2022. 9 pgs.
(Continued)

*Primary Examiner* — Jeremiah R Smith
(74) *Attorney, Agent, or Firm* — Lerner David LLP

(57) ABSTRACT

A method of applying uniform pressure to an all-solid-state battery during activation of the battery and preventing an interface contact surface from being separated as the result of gas generated in the all-solid-state battery is provided. This method increases the lifespan of the battery and an all-solid-state battery manufactured using the same method.

12 Claims, 8 Drawing Sheets

(51) Int. Cl.
  *H01M 10/0585* (2010.01)
  *H01M 10/44* (2006.01)
  *H01M 10/0525* (2010.01)
  *H01M 10/0562* (2010.01)

(52) U.S. Cl.
  CPC ...... *H01M 10/446* (2013.01); *H01M 10/0525* (2013.01); *H01M 10/0562* (2013.01); *H01M 2300/0065* (2013.01); *H01M 2300/0068* (2013.01); *H01M 2300/0082* (2013.01)

(58) Field of Classification Search
  CPC ....... H01M 2300/0082; H01M 4/0447; H01M 10/446; H01M 10/052; H01M 10/0525; B30B 1/003; B30B 5/02; B30B 9/22; B30B 11/001
  See application file for complete search history.

(56) References Cited

U.S. PATENT DOCUMENTS

| | | | | |
|---|---|---|---|---|
| 2010/0310930 | A1* | 12/2010 | Park | B32B 27/308 |
| | | | | 429/185 |
| 2013/0266832 | A1 | 10/2013 | Shirasawa et al. | |
| 2014/0170468 | A1 | 6/2014 | Sasaoka | |
| 2015/0380763 | A1* | 12/2015 | Ohtomo | H01M 4/134 |
| | | | | 429/304 |
| 2016/0028064 | A1* | 1/2016 | Choi | H01M 50/42 |
| | | | | 429/144 |
| 2016/0099485 | A1* | 4/2016 | Onoda | H01M 4/366 |
| | | | | 429/57 |
| 2019/0006699 | A1 | 1/2019 | Jones et al. | |
| 2019/0131658 | A1* | 5/2019 | Sasaki | H01G 11/62 |
| 2019/0148765 | A1* | 5/2019 | Otaki | H01M 10/446 |
| | | | | 429/304 |
| 2019/0372147 | A1 | 12/2019 | Matsumura et al. | |
| 2019/0379083 | A1 | 12/2019 | Jung et al. | |
| 2020/0313198 | A1* | 10/2020 | Zhang | H01M 4/366 |
| 2021/0210786 | A1* | 7/2021 | Asakawa | H01M 10/0569 |
| 2022/0363021 | A1* | 11/2022 | Köffers | B30B 5/02 |
| 2025/0112260 | A1* | 4/2025 | Li | H01M 50/105 |

FOREIGN PATENT DOCUMENTS

| | | |
|---|---|---|
| EP | 3886202 A1 | 9/2021 |
| JP | H05048210 U | 6/1993 |
| JP | H10214638 A | 8/1998 |
| JP | 2001297798 A | 10/2001 |
| JP | 2008147010 A | 6/2008 |
| JP | 2009295289 A | 12/2009 |
| JP | 2012129009 A | 7/2012 |
| JP | 2012151080 A | 8/2012 |
| JP | 2012169204 A | 9/2012 |
| JP | 2012221773 A | 11/2012 |
| JP | 2013084459 A | 5/2013 |
| JP | WO2013008321 A1 | 2/2015 |
| JP | 2018106984 A | 7/2018 |
| KR | 20150050223 A | 5/2015 |
| KR | 20160001399 A | 1/2016 |
| KR | 20180025804 A | 3/2018 |
| KR | 20180025805 A | 3/2018 |
| WO | 2013008321 A1 | 1/2013 |
| WO | 2018055717 A1 | 3/2018 |
| WO | 2019054837 A1 | 3/2019 |

OTHER PUBLICATIONS

International Search Report for Application No. PCT/KR2020/005223 mailed Jul. 24, 2020, pp. 1-2.

* cited by examiner

[FIG. 1]
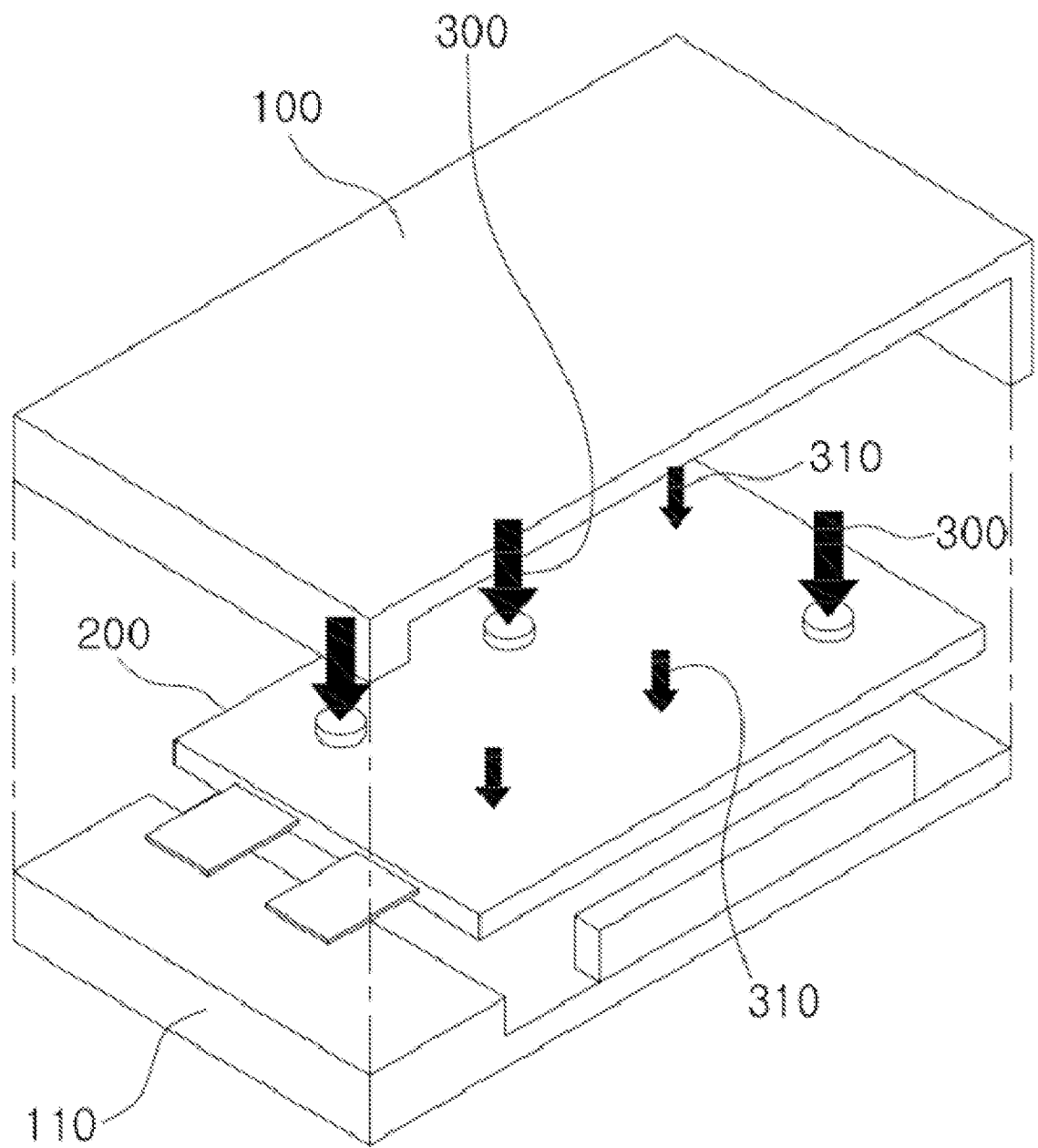

[FIG. 2]
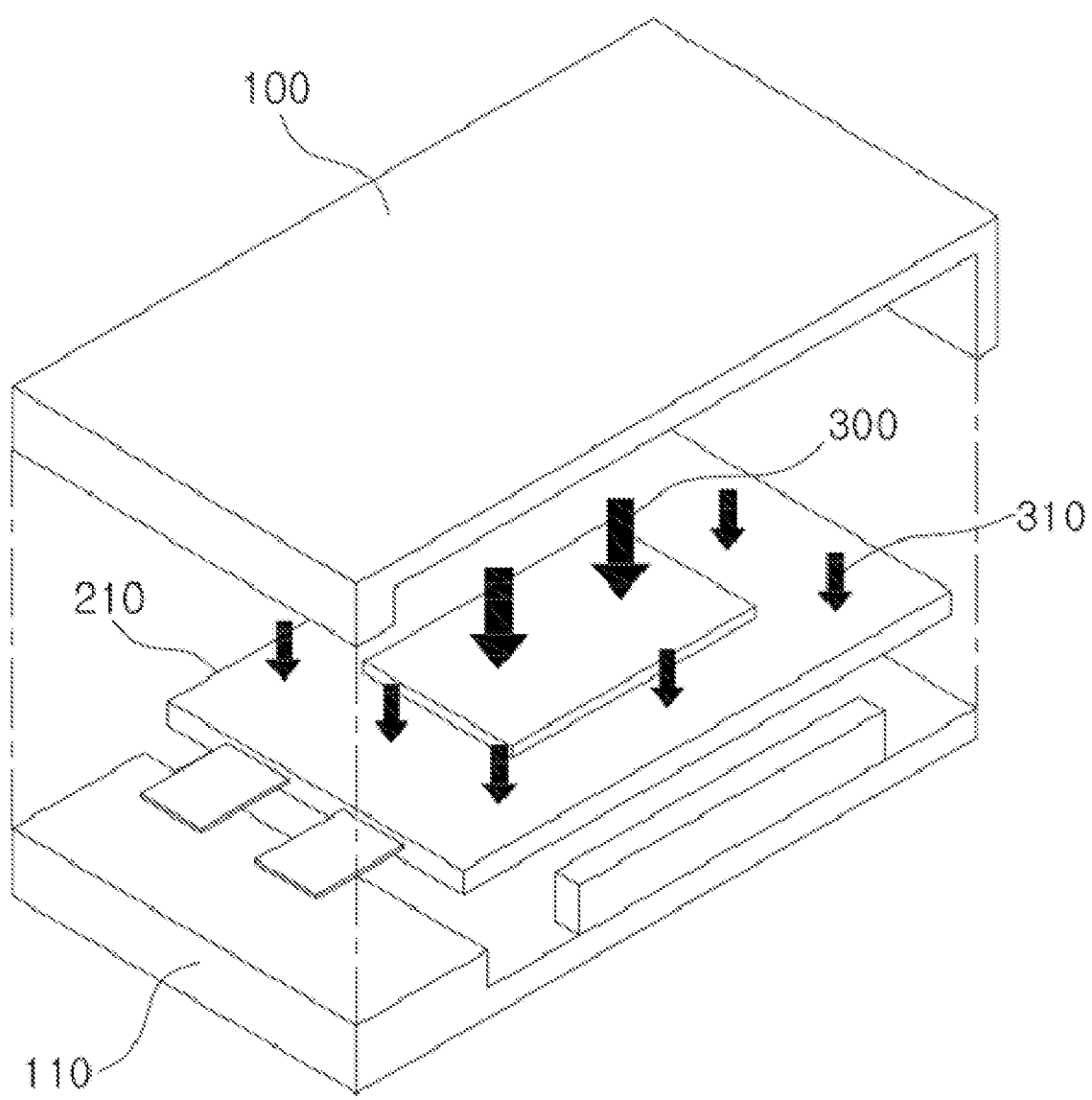

[FIG. 3]
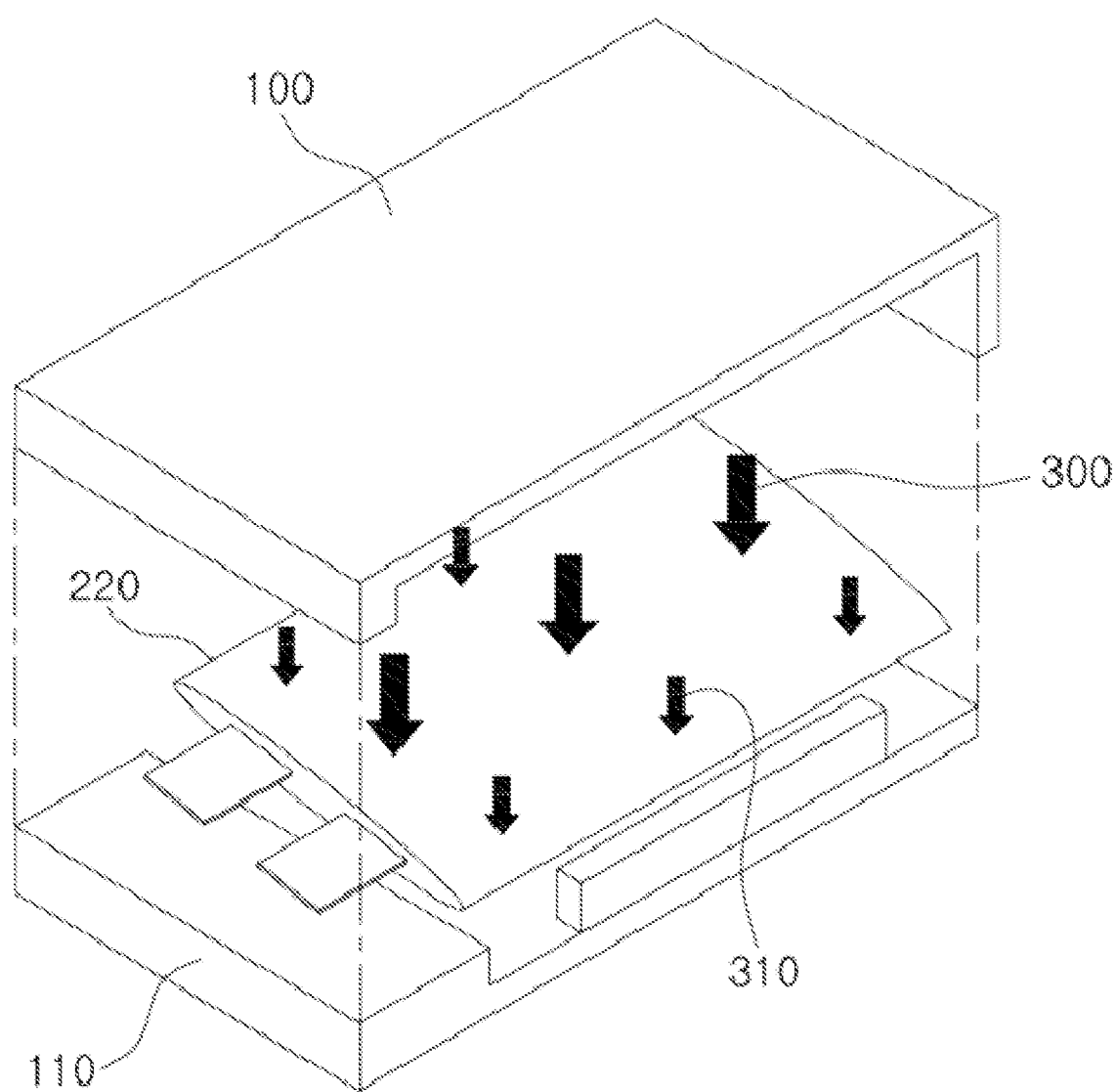

[FIG. 4]
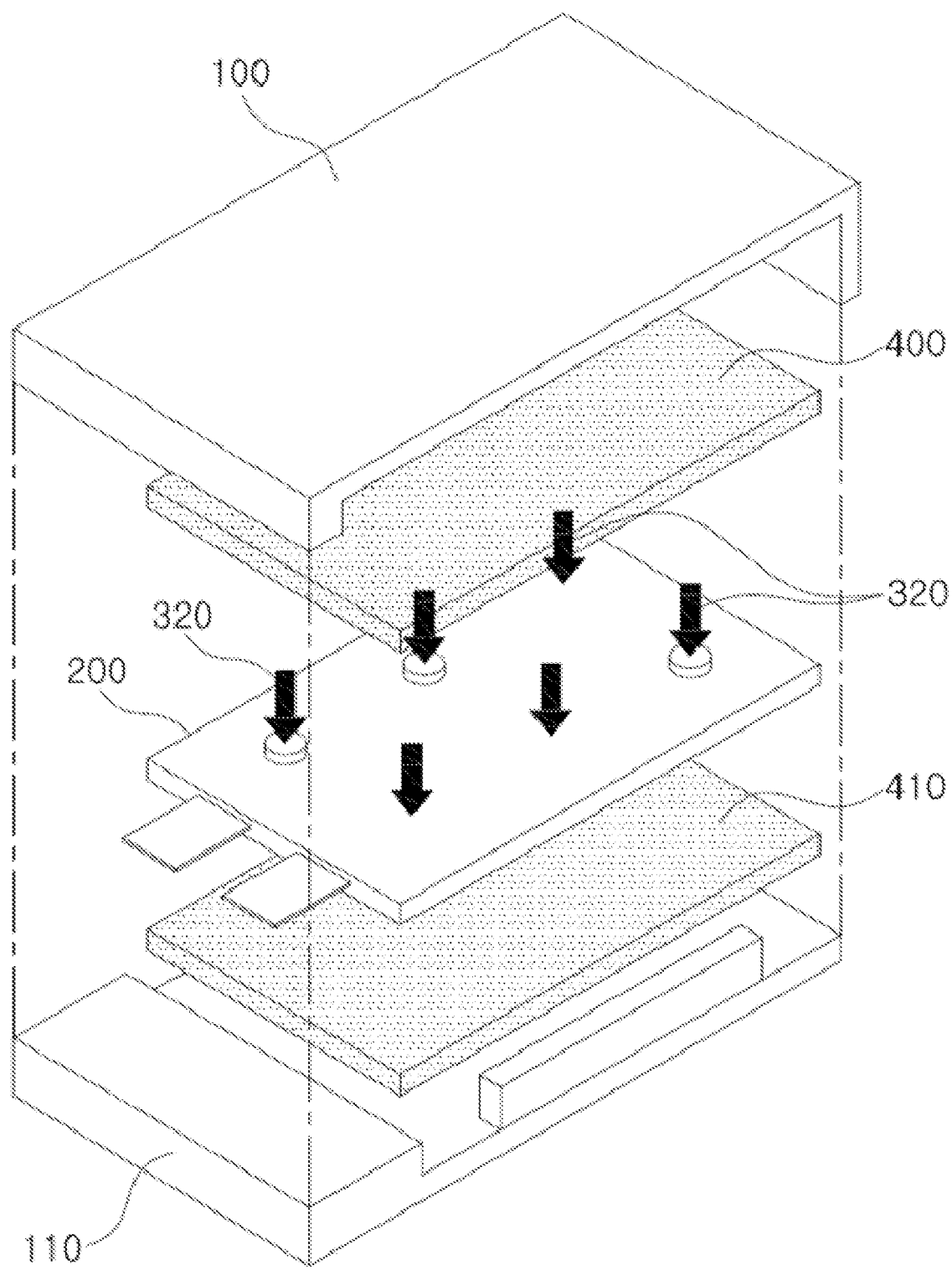

[FIG. 5]
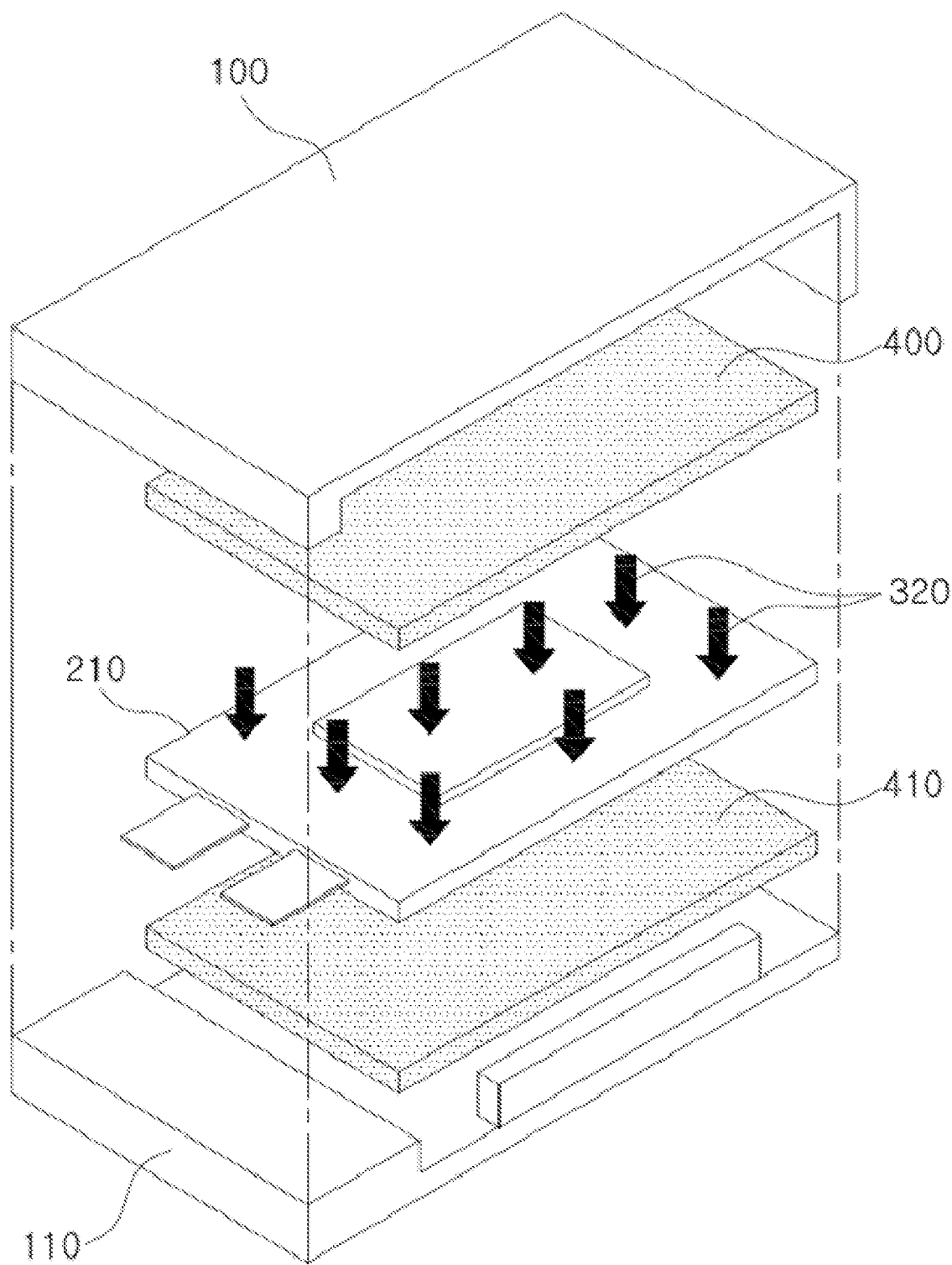

【FIG. 6】
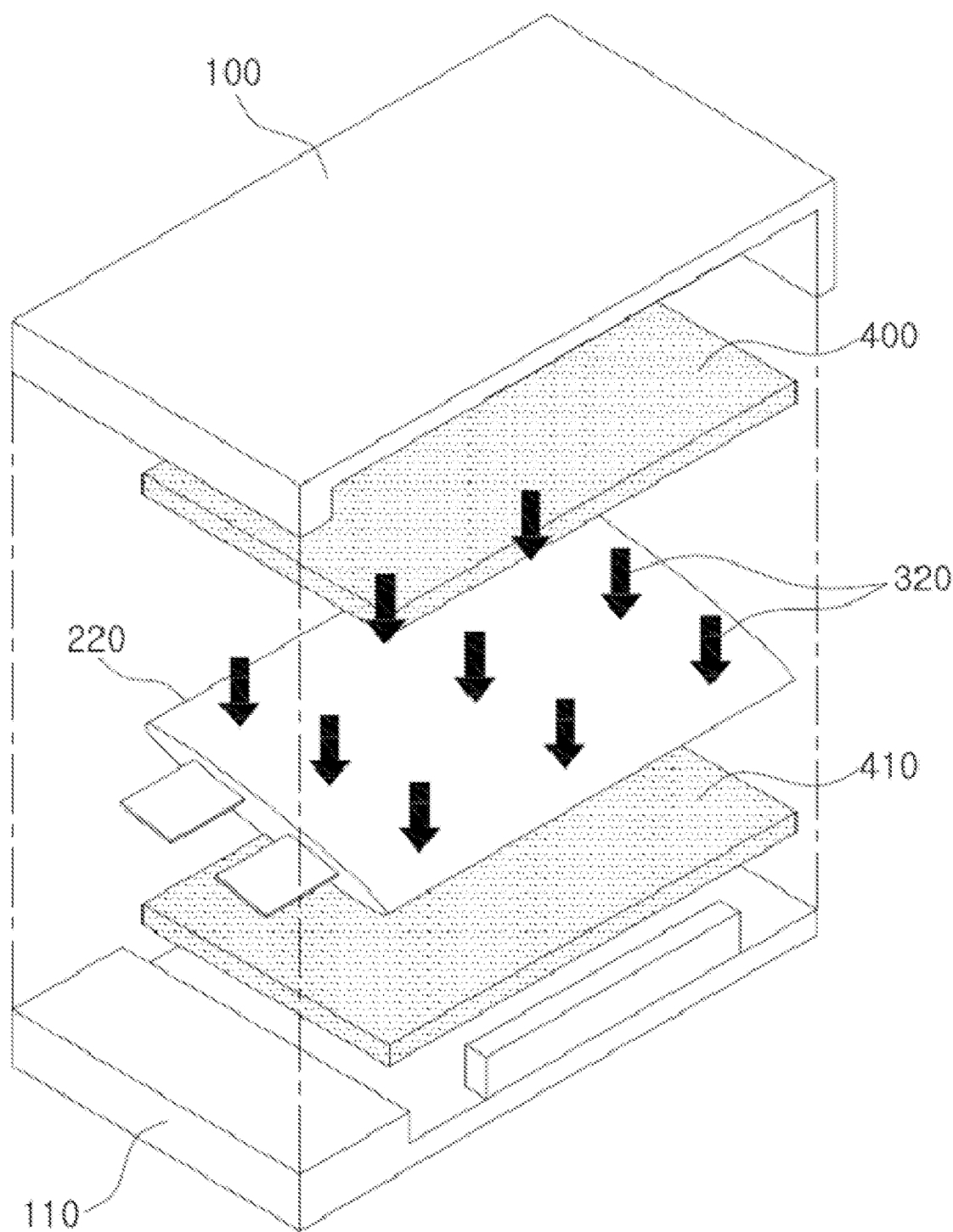

[FIG. 7]
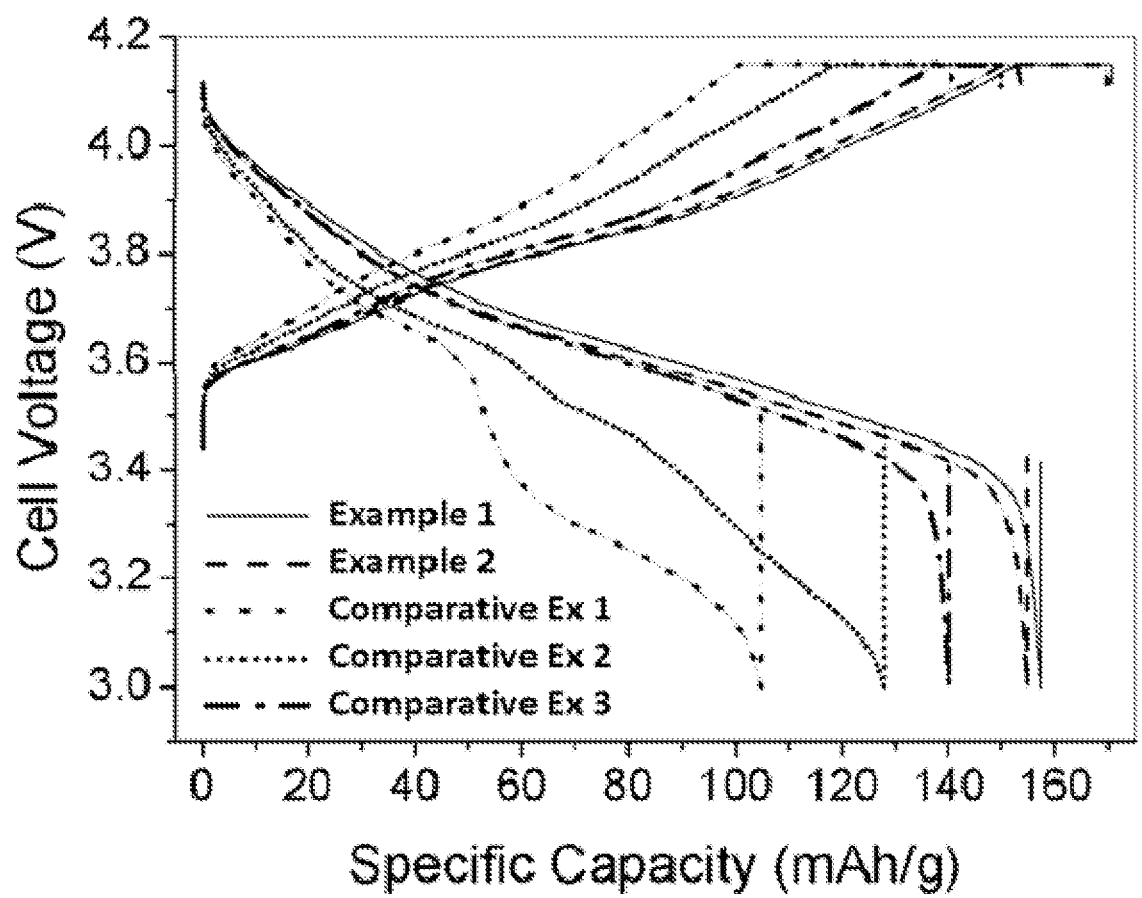

[FIG. 8]
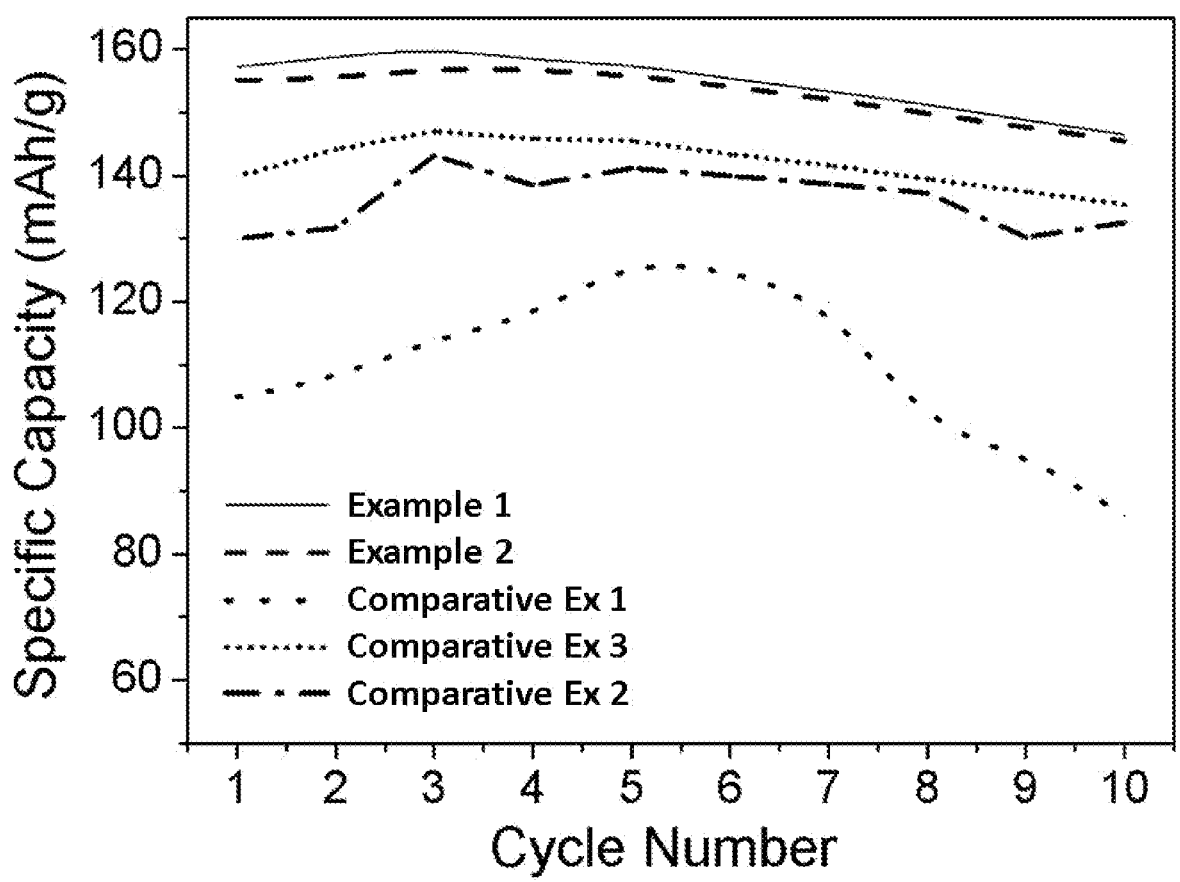

METHOD OF MANUFACTURING ALL-SOLID-STATE BATTERY AND ALL-SOLID-STATE BATTERY MANUFACTURED USING THE SAME

CROSS-REFERENCE TO RELATED APPLICATIONS

The present application is a national stage entry of International Application No. PCT/KR2020/005223 filed on Apr. 20, 2020, which claims priority from Korean Patent Application No. 10-2019-0053691 filed on May 8, 2019, the disclosures of which are hereby incorporated by reference in their entirety.

The present invention relates to a method of manufacturing an all-solid-state battery and an all-solid-state battery manufactured using the same, and more particularly to a method of manufacturing an all-solid-state battery including a process of placing a fluid between the all-solid-state battery and a jig at the time of activation.

BACKGROUND ART

It is expected that the demand for lithium secondary batteries will continuously increase with development of an electric vehicle (EV), a hybrid electric vehicle (HEV), and a plug-in hybrid electric vehicle (Plug-In HEV) in addition to mobile devices and electric home appliances. An all-solid-state battery, which exhibits high stability and energy density and also has a long lifespan, is technology capable of forging a new market for lithium secondary batteries.

In general, a secondary battery undergoes an activation process at the time of manufacture. The activation process includes a process of applying current to the battery to a predetermined voltage and discharging the battery. During the initial charging and discharging process, a protective film is formed on the surface of an electrode, and an electrolyte is decomposed, whereby a large amount of gas is generated. The gas may cause malfunction of a battery cell, and may increase the volume of the battery cell. For this reason, the battery is assembled in the state in which the generated gas is removed, whereby a finished product of the battery is produced.

Various methods are considered in order to remove the gas. There are a method of providing a gas pocket in order to remove gas based on a natural pressure difference from the interior of a battery cell and a chemical method of adding a material capable of reducing generation of gas. In the method of removing the gas based on the natural pressure difference, however, the gas is not sufficiently removed, and the chemical method may disturb chemical reaction in a battery.

In the case in which the battery swells due to gas during activation, performance of the battery is abruptly deteriorated due to interface separation. Much research has been conducted on methods of physically solving this problem in order to improve performance of the battery. A method of performing an activation process in the state in which a battery cell 200 is placed in a jig 100 and 110 and predetermined pressures 300 and 310 are applied to the battery cell, as shown in FIG. 1, is also considered. In the case in which uniform pressure is not applied to the battery, the lifespan of the battery may be shortened. For an all-solid-state battery, an electrolyte is also in a solid state, and therefore the surface of the battery may not be uniform in many cases, and external pressure is also not uniformly distributed due to the properties of a material thereof.

Patent Document 1 provides a construction in which a spacing member configured to allow a fluid to be introduced thereinto is disposed between unit batteries in a case such that the gap between the respective unit batteries is filled with the fluid. The fluid uniformly pressurizes the respective unit batteries. Pressurizing an electrode assembly constituting the battery is one of the methods of preventing interface separation and increasing internal contact area to reduce internal resistance.

Patent Document 1 is different in detailed technology and object from the present invention in that pressure is continuously applied to the battery during use of the battery after activation. A separate space is necessary to supply the fluid into the case, the fluid must not react with the electrode assembly, the external case must be rigid in order to maintain pressure, and it is necessary to additionally supply the fluid through replenishment in the case in which the fluid leaks outside.

Patent Document 2 discloses a secondary battery having a secondary battery electrode assembly received in a case, wherein the secondary battery includes a plate configured to uniformly transmit pressurizing force from a pressurization unit to the secondary battery electrode assembly received therein and the pressurization unit made of an elastic material, the pressurization unit containing air therein.

Patent Document 2 is also different in detailed technology and object from the present invention in that pressure is continuously applied to the battery during use of the battery after activation. A separate space is necessary to dispose the plate and the pressurization unit in the case, and the external case must be rigid in order to maintain pressure. The pressurization unit is configured such that the middle portion thereof swells first, and the thickness of the pressurization unit in section gradually decreases from the middle portion to opposite ends thereof after a predetermined amount of air is injected. As a result, uniform pressure may not be applied to battery cells having various shapes.

Patent Document 3 is characterized in that gas configured to pressurize a battery cells is provided into a case in order to eliminate the fluctuation of pressure in the case. In this case, however, applied pressure may not be uniform due to the external shape of the case, and the battery case may be damaged when external pressure is applied.

Patent Document 4 discloses a structure in which a space between a case and a bipolar battery disposed in the case is filled with a fluid, which is characterized in that pressure of the fluid is adjusted to uniformly pressurize the surface of the battery. However, it is difficult to fix the battery disposed in the case, and it is not possible to apply uniform pressure to the battery in the state in which the battery is fixed using a jig. When external pressure is applied, the battery case may be damaged.

As described above, various technologies capable of applying pressure to an electrode assembly in order to reduce internal resistance during use of a battery after activation have been proposed. For an all-solid-state battery, interface contact defects frequently occur, and therefore various technologies related to pressurization have been applied to the all-solid-state battery.

In the case of the all-solid-state battery, performance of the battery may be deteriorated as the result of deformation thereof during activation due to nonuniform external shape thereof; however, methods of recognizing such a problem during activation of the all-solid-state battery and solving the problem have not yet been proposed.

(Patent Document 1) International Application Publication No. 2013-008321 (2013 Jan. 17)

(Patent Document 2) Korean Patent Application Publication No. 2016-0001399 (2016 Jan. 6)
(Patent Document 3) Japanese Patent Application Publication No. 2012-151080 (2012 Aug. 9)
(Patent Document 4) Japanese Patent Application Publication No. 2008-147010 (2008 Jun. 26)

DISCLOSURE

Technical Problem

The present invention has been made in view of the above problems, and it is an object of the present invention to provide a method of applying uniform pressure to an all-solid-state battery during activation of the battery and preventing an interface contact surface from being separated as the result of gas generated in the all-solid-state battery, thereby increasing lifespan of the battery and an all-solid-state battery manufactured using the same.

Technical Solution

In order to accomplish the above object, the present invention provides a method of manufacturing an all-solid-state battery including a positive electrode, a negative electrode, and a solid electrolyte, the method including the steps of:
  a) coupling a positive electrode, a negative electrode, and a solid electrolyte to manufacture an all-solid-state battery;
  b) placing the all-solid-state battery manufactured in step a) in a jig;
  c) placing a fluid between at least one surface of the all-solid-state battery and the jig;
  d) fixing the all-solid-state battery using the jig; and
  e) charging and discharging the all-solid-state battery in order to activate the all-solid-state battery.

In addition, step b) and step c) may be performed in that order, simultaneously, or in reverse order.

In addition, the method may further include placing the all-solid-state battery in a pouch or in a can after step a).

In addition, step e) is performing charging and discharging a predetermined number of times, and the method may further include removing the fluid and performing additional charging and discharging after step e).

In addition, when performing charging and discharging, charging may be performed under conditions of (CC/CV): 0.05 C/4.15V, 0.02 C cut-off, and rest 30 min, and discharging may be performed under conditions of (CC): 0.05 C and 3V cut off.

In addition, the fluid may be gas or liquid.

In addition, the fluid may be uniformly distributed between the jig and the entire surface of the all-solid-state battery that abuts the jig.

In addition, the fluid may be contained in a separate sealed pouch.

In addition, the fluid may be uniformly distributed between the jig and the entire opposite surfaces of the all-solid-state battery that abuts the jig in the state of being contained in a single sealed pouch.

In addition, the sealed pouch may be made of a material that exhibits elasticity to the extent to which the pouch is not damaged from the jig and the fluid in the pouch uniformly distributes the pressure from the jig between the jig and the entire surface of the all-solid-state battery that abuts the jig.

In addition, the sealed pouch may be provided with a means configured to add gas or liquid through replenishment.

In addition, the sealed pouch may be attached to one surface of the jig.

In addition, the method may further include sealing the pouch or the can after the activation step of step e) is completed.

In addition, an all-solid-state battery may be manufactured using the method according to any one of the methods described above.

In the present invention, individual application of the technical solutions described above or application of various possible combinations thereof is possible.

DESCRIPTION OF DRAWINGS

FIG. 1 is a schematic view showing an all-solid-state battery having a surface that is not smooth and pressure that is applied from a jig to the all-solid-state battery at the time of a conventional activation process.

FIG. 2 is a schematic view showing an all-solid-state battery configured such that a portion of the surface thereof protrudes and pressure that is applied from the jig to the all-solid-state battery at the time of the conventional activation process.

FIG. 3 is a schematic view showing an oval all-solid-state battery and pressure that is applied from the jig to the all-solid-state battery at the time of the conventional activation process.

FIG. 4 is a schematic view showing an all-solid-state battery having a surface that is not smooth and pressure that is applied from the jig to the all-solid-state battery at the time of an activation process according to the present application.

FIG. 5 is a schematic view showing an all-solid-state battery configured such that a portion of the surface thereof protrudes and pressure that is applied from the jig to the all-solid-state battery at the time of the activation process according to the present application.

FIG. 6 is a schematic view showing an oval all-solid-state battery and pressure that is applied from the jig to the all-solid-state battery at the time of the activation process according to the present application.

FIG. 7 is a graph showing capacities of batteries according to examples of the present application and comparative examples at the time of initial charging and discharging.

FIG. 8 is a graph showing capacities of the batteries according to examples of the present application and comparative examples when charging and discharging are performed ten times.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail.

The present invention provides a method of manufacturing an all-solid-state battery including a positive electrode, a negative electrode, and a solid electrolyte, the method including the steps of:

a) coupling a positive electrode, a negative electrode, and a solid electrolyte to manufacture an all-solid-state battery;
b) placing the all-solid-state battery manufactured in step a) in a jig;
c) placing a fluid between at least one surface of the all-solid-state battery and the jig;
d) fixing the all-solid-state battery using the jig; and
e) charging and discharging the all-solid-state battery.

The all-solid-state battery is placed such that the surface of the all-solid-state battery including no electrodes abuts on the jig. In order to prevent swelling of the battery, all surfaces of the battery excluding the electrodes may abut on the jig.

A fluid may be placed between one surface of the all-solid-state battery and the jig or may be placed between opposite surfaces of the all-solid-state battery and the jig. More preferably, the fluid is placed between the opposite surfaces of the all-solid-state battery and the jig. In the case in which the fluid is placed between the opposite surfaces of the all-solid-state battery and the jig, uniform pressure may be applied to the opposite surfaces of the battery cell, and uniform pressure may also be applied to any of various-shaped battery cells. In the case in which the fluid is placed between one surface of the all-solid-state battery and the jig, the fluid may exhibit viscosity to the extent to which the fluid cannot move to the gap between the other surface of the all-solid-state battery and the jig. The jig may be provided with a layer or a step configured to prevent movement of the fluid. At this time, the fluid may be present so as to have an area equal to or greater than the area of the largest surface of the battery. In the case in which the fluid is present so as to have an area less than the area of the battery, pressure applied to the portion of the battery on which the fluid is not placed varies. For this reason, the fluid must have a size to the extent to which uniform pressure is applied to a battery case.

The pressure applied to the all-solid-state battery must be between 50 kgf/cm$^2$ and 5000 kgf/cm$^2$.

In the case in which the pressure applied to the all-solid-state battery is less than 50 kgf/cm$^2$, the jig cannot function properly, whereby it is not possible to prevent swelling of the battery cell due to gas. In the case in which the pressure applied to the all-solid-state battery is greater than 5000 kgf/cm$^2$, the fluid cannot function properly, whereby uniform pressure is not applied to the battery cell and thus the battery cell may be damaged.

The structure of the all-solid-state battery is not restricted. A wound type structure, a stacked type structure, a stacked/folded type structure, and a step type structure in which a plurality of batteries is stacked in a single pouch may all be applied to the all-solid-state battery. The all-solid-state battery may include a gas discharge port. The all-solid-state battery may be configured in a state in which the portion of the battery at which the electrodes are located is partially temporarily sealed.

The kind of the all-solid-state battery is not restricted, and any all-solid-state batteries having high efficiency may be used without restriction.

Step b) and step c) may be performed in that order, simultaneously, or in reverse order.

In the case in which the all-solid-state battery and the fluid are simultaneously disposed in the jig, a step of protecting the electrodes such that the electrodes do not react with the fluid may be included. At this time, the electrodes and the fluid may be introduced into the jig at different positions or the same position. The size of the jig is not restricted as long as the electrodes and the fluid can be introduced into the jig. However, in the case in which a fluid layer is made of gas or liquid, the jig has a fluid layer, and thus, the jig may be configured to have a structure in which the gas or the liquid cannot be discharged from the fluid layer.

However, when the fluid is a gas or a liquid, the jig has a fluid layer so that the gas or liquid cannot escape from the fluid layer.

The fixing mode of the jig is not restricted as long as the jig is capable of fixing the fluid layer and the battery cell to each other. The jig may have a shape similar to the shape of the battery cell or a shape different from the shape of the battery cell. The jig may have a structure capable of wrapping five of the six surfaces of the battery cell or a structure capable of fixing only the widest upper and lower surfaces of the battery.

In addition, a step of placing the all-solid-state battery in a pouch or in a can may be added after step a).

The pouch or the can is not particularly restricted. Preferably, however, the pouch or the can is made of a material that exhibits low reactivity with the fluid. Typically, polyethylene, polypropylene, polycarbonate, or an aluminum laminate sheet may be included.

The pouch or the can may include a coating layer in order to reduce reactivity with the fluid. The thickness of the coating layer is not particularly restricted as long as the coating layer is capable of reducing reaction between the fluid and the case while not reducing capacity of the battery. The coating layer may include an inactive particle. The inactive particle may be an organic particle and/or an inorganic particle although the inactive particle is not restricted. In the case in which the inactive particle is an organic particle, the inactive particle may be a polymer or a silane-based compound. For example, the polymer may be PE, PP, PS, PVdF, PTFE, PET, PMMA, or PANdlf, and the silane-based compound may be hexamethyldisilazane (HMDS), trimethylchlorosilane (TMSCL), polydimethylsiloxane (PDMS), or dimethyldichlorosilane (DDS). For example, the inorganic particle may be one or a mixture of two or more selected from the group consisting of $SiO_2$, $Al_2O_3$, MgO, $TiO_2$, $ZrO_2$, CaO, $Y_2O_3$, and SrO. The coating layer may have a thickness of 1 µm to 160 µm. In the case in which the thickness of the coating layer is less than 1 µm, the material in the coating layer is not properly distributed, and therefore the coating layer may not function properly, which is undesirable. In the case in which the thickness of the coating layer is greater than 160 µm, spatial efficiency of the battery is reduced compared to effects of the battery, which is also undesirable. In addition, an outer resin layer may be added instead of/together with the coating layer. The outer resin layer may be made of a polyolefin-based resin that exhibits low reactivity with the fluid. More preferably, the outer resin layer is made of polypropylene.

The shape and roughness of the surface of the pouch or the can are not restricted. The surface may be rough, or a portion of the surface may protrude or may be recessed. The roughness of the surface may be fine to the extent to which the surface is roughened at the time of processing the material, as shown in FIG. 4, or the surface may have a convex-concave portion configured to allow the battery cell to be coupled to another battery cell or an external device, as shown in FIG. 5. In addition, the shape of the pouch or the can is not restricted. The method of manufacturing the all-solid-state battery according to the present invention may be applied to an oval can, as shown in FIG. 6, a prismatic can, or a can having any of various structures, such as a stepped structure.

In addition, step e) is a step of performing charging and discharging a predetermined number of times.

A step of removing the fluid and performing additional charging and discharging may be further added after step e).

Charging and discharging may be performed one to ten times in the state in which the fluid is present. In addition, charging and discharging may be performed one to ten times in the state in which the fluid is not present. When charging and discharging are performed one to ten times, charging and discharging may be performed all times in the state in which the fluid is or is not present, charging and discharging may be performed some times in the state in which the fluid is present, or charging and discharging may be performed some times in the state in which the fluid is not present.

In addition, at the time of charging and discharging, charging may be performed under conditions of (CC/CV): 0.05 C/4.15V, 0.02 C cut-off, and rest 30 min, and discharging may be performed under conditions of (CC): 0.05 C and 3V cut off.

The above conditions are set in order to improve efficiency in charging and discharging, and charging and discharging conditions are not limited to the above conditions as long as charging and discharging are performed in order to increase capacity of the battery.

In addition, a step of sealing the pouch or the can may be further added after step e), i.e. the activation step, is completed.

The pouch or the can may have a thermally fusible film for sealing. The thermally fusible film may include a material that can be thermally fused at a temperature of 160° C. to 210° C. and a pressure of 1 to 3 kgf/cm$^2$. The thermally fusible film may have a thickness of 1 μm to 1 mm and a width of 1 mm to 20 mm. In the case in which the thermally fusible film is too narrow, it is difficult to achieve improvement in sealability due to thermal fusion. In the case in which the thickness or the width of the thermally fusible film is too large, on the other hand, a step may be formed between the thermally fusible film and a sealing portion therearound, whereby sealability on the interface therebetween may be deteriorated. The material of the thermally fusible film is not particularly restricted as long as the material exhibits high moisture resistance and thermal fusibility. Polyethylene and polypropylene, which are polyolefin-based polymer resins, and a combination thereof may be mentioned as examples.

The pouch or the can may be sealed by ultrasonic or laser metal welding. The pouch or the can may be sealed by pressing using a ball mill.

In the case of the pouch-shaped all-solid-state battery, a step of folding the pouch case may be included after the sealing step. The pouch-shaped all-solid-state battery may be formed in a shape having no angled portions.

In addition, the fluid may be gas, liquid, or mobile solid, and the scope of the fluid may be changed and is not restricted as long as the fluid is capable of absorbing pressure from the jig. Preferably, however, the fluid is gas in order to improve performance of the battery while uniform pressure is applied to the jig. In addition, it is not necessary for the fluid to be constituted by a single material. Some of the fluid may be gas and some of the fluid may be liquid, or the fluid may include all of liquid, solid, and gas.

The fluid may be constituted by a material that is inactive or at least does not affect the performance of the battery. Here, the gas may be inactive gas. For example, the gas may include nitrogen gas or argon gas. Here, the liquid may be inactive liquid. A material, such as kerosene or naphtha, may be mentioned as an example. In the case in which the fluid is separately contained in the pouch, it is not necessary for the fluid to be a material that is inactive or at least does not affect the performance of the battery.

In addition, the fluid may be uniformly distributed between the jig and the surface of the all-solid-state battery that abuts the jig.

The fluid may exhibit viscosity to the extent to which pressure from the jig is uniformly distributed between the jig and the entire surface of the all-solid-state battery that abuts the jig.

The fluid may be a hydrophobic material that prevents permeation of moisture into the battery.

In addition, the fluid may be contained in a separate sealed pouch.

In addition, the fluid may be uniformly distributed between the jig and the entire opposite surfaces of the all-solid-state battery that abuts the jig in the state of being contained in a single sealed pouch.

The fluid contained in the pouch may be gas or liquid.

In addition, the sealed pouch may be made of a material that exhibits elasticity to the extent to which the pouch is not damaged by pressure from the jig and the fluid in the pouch uniformly distributes the pressure from the jig between the jig and the entire surface of the all-solid-state battery that abuts the jig.

The pressure may be between 50 kgf/cm$^2$ and 5000 kgf/cm$^2$. In the case in which the pressure is less than kgf/cm$^2$, the pouch absorbs the pressure, whereby the pressure from the jig may not be transmitted to the battery cell. In the case in which the pressure is greater than 5000 kgf/cm$^2$, the battery cell may be damaged even though the pouch absorbs the pressure, or predetermined pressure may not be transmitted to the battery cell.

The shape of the pouch is not restricted, but is limited to a shape capable of wrapping all of the portions of the battery cell that may abut on the jig. The pouch may be made of an elastic polymer that exhibits high elasticity or rubber. The thickness of the pouch must be set to the extent to which the pouch does not disturb action of the fluid therein. In the case in which the thickness of the pouch is 10 μm or less, the pouch cannot withstand pressure. In the case in which the thickness of the pouch is 0.5 cm or more, the effect of the fluid in the pouch uniformly transmitting pressure may be deteriorated.

In the case in which the jig is disposed above and below the battery, the pouch may be disposed between the battery and the jig. A case in which the jig is disposed on the left and right sides of the battery may be included; however the structure in which jig is disposed above and below the battery is preferred.

In addition, the sealed pouch may be provided with a means configured to add gas or liquid through replenishment. The replenishment means may be formed in a shape having an injection port. The replenishment means may have a structure capable of preventing the fluid from being discharged by the pressure from the jig.

The sealed pouch may be made of a material that does not chemically react with the fluid.

The pouch is not particularly restricted. Preferably, however, the pouch is made of a material that exhibits low reactivity with the fluid. Typically, polyethylene, polypropylene, polycarbonate, or an aluminum laminate sheet may be included.

The pouch may include a coating layer in order to reduce reactivity with the fluid. The thickness of the coating layer is not particularly restricted as long as the coating layer is capable of reducing reaction with the fluid while not reducing capacity of the battery. The coating layer may include an inactive particle. The inactive particle may be an organic particle and/or an inorganic particle although the inactive particle is not restricted. In the case in which the inactive particle is an organic particle, the inactive particle may be a polymer or a silane-based compound. For example, the polymer may be PE, PP, PS, PVdF, PTFE, PET, PMMA, or PANdlf, and the silane-based compound may be hexamethyldisilazane (HMDS), trimethylchlorosilane (TMSCL), polydimethylsiloxane (PDMS), or dimethyldichlorosilane (DDS). For example, the inorganic particle may be one or a mixture of two or more selected from the group consisting of $SiO_2$, $Al_2O_3$, MgO, $TiO_2$, $ZrO_2$, CaO, $Y_2O_3$, and SrO. The coating layer may have a thickness of 1 μm to 160 μm. In the case in which the thickness of the coating layer is less than 1 μm, the material in the coating layer is not properly distributed, and therefore the coating layer may not function properly, which is undesirable. In the case in which the thickness of the coating layer is greater than 160 μm, spatial efficiency of the battery is reduced compared to effects of the battery, which is also undesirable. In addition, an outer resin layer may be added instead of/together with the coating layer. The outer resin layer may be made of a polyolefin-based resin that exhibits low reactivity with the fluid. More preferably, the outer resin layer is made of polypropylene.

In addition, the pouch may be attached to one surface of the jig.

The pouch is attached to one surface of the jig in order to prevent the pouch from being moved by gravity.

FIG. 1 is a schematic view showing an all-solid-state battery 200 having a surface that is not smooth and pressures 300 and 310 that are applied from a jig 100 and 110 to the all-solid-state battery 200 at the time of a conventional activation process. It can be seen that higher pressure is applied to the protruding portion of the surface than to the recessed portion of the surface. In FIGS. 1 to 3, pressures 300, 310, and 320 are indicated by arrows having different sizes. In the case in which the size of the arrow is larger, pressure is higher. In the case in which the size of the arrow is smaller, pressure is lower. In the case in which the sizes of the arrows are equal to each other, pressure is uniform. In contrast, in the activation process according to the present invention, as shown in FIG. 4, fluid layers 400 and 410 uniformly wrap a battery, whereby uniform pressure is applied to the battery.

FIG. 2 is a schematic view showing an all-solid-state battery 210 configured such that a portion of the surface thereof protrudes and pressures 300 and 310 that are applied from the jig 100 and 110 to the all-solid-state battery 210 at the time of the conventional activation process. Even in the case of the all-solid-state battery 210 having the protrusion, higher pressure is applied to the protruding portion of the battery than the planar portion of the battery. In contrast, in the activation process according to the present invention, as shown in FIG. 5, fluid layers 400 and 410 uniformly wrap a battery, whereby uniform pressure is applied to the battery.

FIG. 3 is a schematic view showing an oval all-solid-state battery 220 and pressures 300 and 310 that are applied from the jig 100 and 110 to the all-solid-state battery 220 at the time of the conventional activation process. In the case in which the oval all-solid-state battery 220 is disposed in the planar jig 100 and 110, the middle portion of the battery protrudes. Even in the case of the oval all-solid-state battery 220, therefore, pressure is applied to the middle portion of the battery. In contrast, in the activation process according to the present invention, as shown in FIG. 6, fluid layers 400 and 410 uniformly wrap a battery, whereby uniform pressure is applied to the battery.

Hereinafter, the present invention will be described with reference to the following examples. These examples are provided only for easier understanding of the present invention and should not be construed as limiting the scope of the present invention.

The examples of the present invention will be described in detail with reference to the accompanying drawings.

EXAMPLES

The following examples and comparative examples were charged and discharged using the following method.

In the examples and the comparative examples, pouch-shaped battery cells configured such that a planar portion of each of the battery cells to which no separate shape or roughness was added was a round quadrangular circle and having uniform heights were used.

At the time of charging and discharging each of the examples and the comparative examples, charging was performed under conditions of (CC/CV): 0.05 C/4.15V, 0.02 C cut-off, and rest 30 min, and discharging was performed under conditions of (CC): 0.05 C and 3V cut off. A pressure of 500 $kgf/cm^2$ was applied to a jig. The jig was configured so as to have a shape wrapping all surfaces of the battery. A fluid pouch was configured so as to wrap all of the surfaces of the battery cell. The fluid pouch was configured to have a shape with a predetermined thickness. A fluid pouch having a thickness of 75 μm was used.

In Example 1, a fluid pouch containing gas in the atmosphere was disposed between the battery cell and the jig.

In Example 2, a fluid pouch containing water was disposed between the battery cell and the jig.

In Comparative Example 1, there was nothing between the battery cell and the jig.

In Comparative Example 2, silicon pads were disposed so as to wrap the entireties of the upper and lower surfaces of the battery cell.

In Comparative Example 3, silicon pads were disposed so as to wrap portions of the upper and lower surfaces of the battery cell.

Referring to FIG. 7, initial charge and discharge capacities of the batteries charged and discharged once according to the examples of the present application and the comparative examples were measured, and the pouch containing gas had the highest charge and discharge capacities. The pouch containing liquid had the second highest charge and discharge capacities. The battery capacity of Comparative Example 1, in which there was nothing between the battery cell and the jig, was the lowest.

These were meaningfully maintained even in the case in which charging and discharging were performed ten times.

As can be seen from FIG. 8, the examples of the present application and the comparative examples had the capacities in the same sequence as one-time charging and discharging even when the batteries were charged and discharged ten times.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100, 110: Jig
200, 210, 220: All-solid-state batteries
300, 310, 320: Pressures applied by jig
400, 410: Fluid layers

INDUSTRIAL APPLICABILITY

As is apparent from the above description, the present invention relates to a method of uniformly applying pressure between a battery cell and a jig to a battery at the time of activating the battery, and has advantages in that uniform pressure is applied to the battery at the time of activation and the initial performance of the battery is improved, whereby the lifespan of the battery is longer than the lifespan of a conventional battery.

The invention claimed is:

1. A method of manufacturing an all-solid-state battery including a positive electrode, a negative electrode, and a solid electrolyte, comprising:
   a) coupling the positive electrode, the negative electrode, and the solid electrolyte to manufacture the all-solid-state battery;
   b) placing the all-solid-state battery manufactured in step a) in a jig;
   c) placing a fluid between at least one surface of the all-solid-state battery resulted from step b) and the jig;
   d) fixing the all-solid-state battery resulted from step c) using the jig; and
   e) charging and discharging the all-solid-state battery resulted from step d) while the all-solid-state battery is pressurized by the jig to activate the all-solid-state battery,
   wherein the fluid is contained in a separate sealed pouch having a coating layer,
   wherein the separate sealed pouch has a thickness of greater than 10 μm and less than 0.5 cm, and
   wherein a pressure of the jig of 500 kgf/cm$^2$ to 5000 kgf/cm$^2$ is applied to the all-solid-state battery.

2. The method according to claim 1, wherein the step b) and the step c) are performed in original order, simultaneously, or in reverse order.

3. The method according to claim 2, further comprising placing the all-solid-state battery resulted from step a) in a pouch or in a can after the step a).

4. The method according to claim 3, further comprising sealing the pouch or the can after the activation step of the step e) is completed.

5. The method according to claim 1, wherein
   in the step e), the charging and the discharging is performed a predetermined number of times, and
   wherein the method further comprises removing the fluid and performing additional charging and discharging after the step e).

6. The method according to claim 5, wherein, the charging is performed under conditions of (CC/CV): 0.05C/4.15V, 0.02C cut-off, and rest 30 min, and the discharging is performed under conditions of (CC): 0.05C and 3V cut off.

7. The method according to claim 1, wherein the fluid is gas or liquid.

8. The method according to claim 1, wherein the fluid is uniformly distributed between the jig and an entire surface of the all-solid-state battery resulted from the step b) that abuts the jig.

9. The method according to claim 1, wherein the fluid is uniformly distributed between the jig and an entire opposite surface of the all-solid-state battery resulted from the step b) that abuts the jig, where the fluid is contained in the single sealed pouch.

10. The method according to claim 1, wherein the sealed pouch is made of a material that exhibits elasticity to an extent to which the sealed pouch is not damaged by pressure from the jig, and the fluid in the sealed pouch uniformly distributes the pressure from the jig between the jig and the entire surface of the all-solid-state battery resulted from the step b) that abuts the jig.

11. The method according to claim 1, wherein the sealed pouch includes a replenishment means that is configured to add gas or liquid.

12. The method according to claim 1, wherein the sealed pouch is attached to one surface of the jig.

* * * * *